United States Patent [19]

Yoshida

[11] Patent Number: 4,758,318

[45] Date of Patent: Jul. 19, 1988

[54] METHOD FOR IMPROVEMENT OF SOIL

[75] Inventor: Tadayuki Yoshida, Fukuoka, Japan

[73] Assignee: Sankyo Yuki Kabushiki Kaisha, Fukuoka, Japan

[21] Appl. No.: 41,287

[22] Filed: Apr. 22, 1987

[30] Foreign Application Priority Data

May 2, 1986 [JP] Japan .................................. 61-101153

[51] Int. Cl.⁴ ............................................... C25F 5/00
[52] U.S. Cl. ...................................... 204/131; 47/1.3; 47/DIG. 10
[58] Field of Search ........... 204/131; 47/1.3, DIG. 10

[56] References Cited

U.S. PATENT DOCUMENTS 1,172,367  2/1916  Kitsee ..................................... 47/1.3
2,831,804  4/1958  Collopy ............................... 204/131

OTHER PUBLICATIONS

Electroplating Engineering Handbook, A. K. Graham et al, Reinhold Books, 1955, p .554.

Primary Examiner—R. L. Andrews
Attorney, Agent, or Firm—Stevens, Davis, Miller & Mosher

[57] ABSTRACT

The molds infesting a given soil are extirpated by the flow of a pulsating direct current of not less than 50 mA to prevent a farm product from diseases causable by the aforementioned molds.

4 Claims, 3 Drawing Sheets

METHOD FOR IMPROVEMENT OF SOIL

BACKGROUND OF THE INVENTION

This invention relates to a method for the improvement of soil to be carried out for the protection of farm products against diseases, and more particularly to a method for extirpating molds by electrical treatment of soil.

Heretofore, as a means of electrically extirpating nematodes infesting roots of farm products, the method which effects the extirpation by applying high-voltage electric pulses to the soil near the roots of farm products has been known to the art (Japanese Patent Application Laid-open No. 216533/1984).

This method aims to extirpate nematodes by the flow of a pulsating shock current of the intensity of several milliamperes without entailing a heavy power consumption or exerting adverse effects on farm products under treatment.

The conventional method described above indeeds exhibits a very high effect in the extirpation of nematodes. It has not produced any appreicable effect, however, in the extirpation of molds. Thus, it has the disadvantage that it is incapable of protecting farm products against deseases caused by molds in soil.

SUMMARY OF THE INVENTION

An object of this invention is to provide a method for preventing farm products from diseases caused by molds by preparatorily extirpating molds in soil without inflicting any injury upon the farm products. To accomplish the object described above according to this invention, there is provided a method which comprises passing a pulsating direct current of not less than 50 mA through the soil encircling the roots of given farm products.

The other characteristics and advantages of the present invention will become apparent from the description given in further detail herein below with reference to the accompanying drawings.

DETAILED DESCRIPTION OF THE INVENTION

The invention will be described below with reference to FIG. 1 through FIG. 5.

This invention is directed to a method which consists in feeding a pulsating direct current of not less than 50 mA to the soil under treatment.

Figure 1:
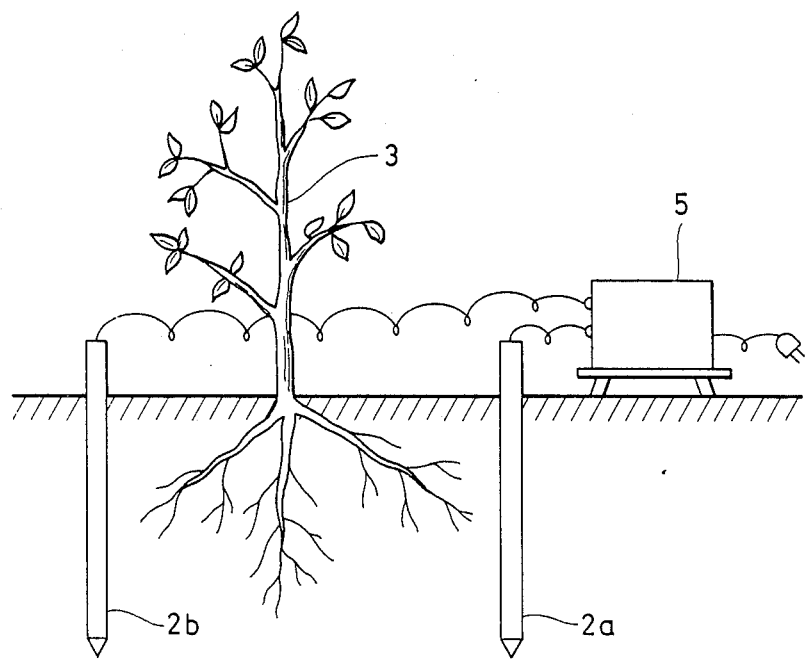
FIG. 1 through FIG. 5 are explanatory diagram each illustrating a typical method for feeding a pulsating electric current to the soil under treatment.

In the present invention, the supply of the pulsating electric current to the soil is accomplished by burying a pair of bar electrodes $2a$, $2b$ in the soil as illustrated in FIG. 1, for example, and applying a high-voltage pulse between the electrodes $2a$, $2b$. The treatment of the soil 1 in accordance with this invention can be carried out equally effectively before and after farm products 3 are planted. When the treatment is to be performed after the plantation, the two electrodes $2a$, $2b$ are desired to be disposed so as to nip the farm product 3 for the purpose of ensuring concentric treatment of the environs of the farm products.

The distance between the electrodes $2a$, $2b$ and the magnitude of the voltage applied between the electrodes $2a$, $2b$ are adjusted so as to produce the flow of pulsating electric current in a required volume. If the distance between the electrodes $2a$, $2b$ is too short, the range of the soil in which the treatment is obtained effectively is too narrow for the treatment to be fully practicable. If the distance between the electrodes $2a$, $2b$ is unduly long, the magnitude of the voltage applied between the electrodes $2a$, $2b$ required for the flow of a pulsating electric current in a sufficient amount must be increased possibly to the extent of rendering the cost of equipment prohibitive. It is, therefore, desirable to adjust the distance between the electrodes $2a$, $2b$ so that a pulse voltage in the range of 300 to 20000 V, preferably 1000 to 10000 V, will be applied between the electrodes $2a$, $2b$ and, consequently, a pulsating electric current will be obtained in a required amount.

Figure 2:
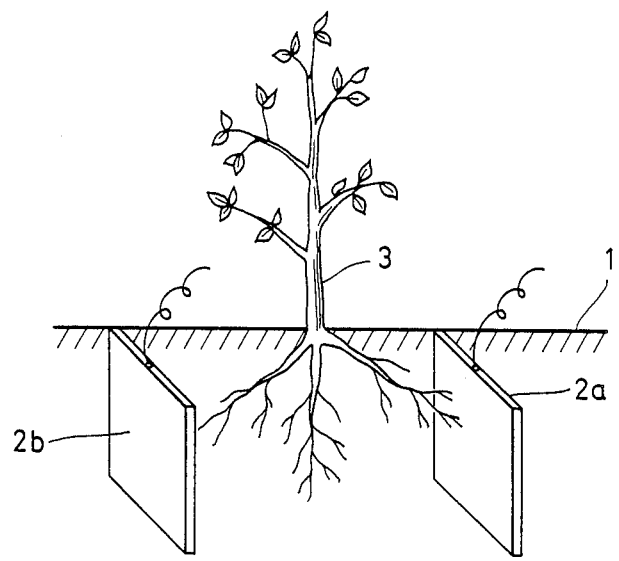
Figure 3:
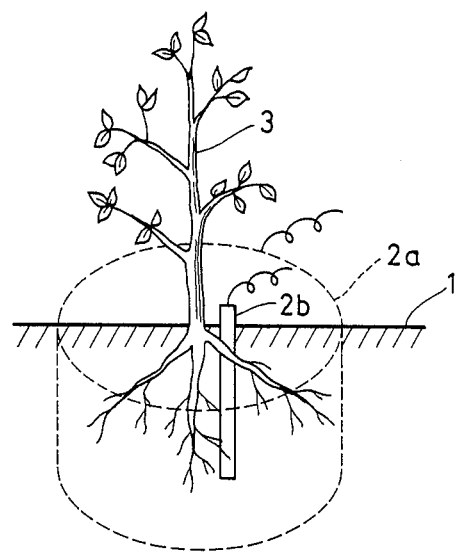

Another method for effecting the supply of the pulsating electric current to the soil 1 contemplated by this invention comprises burying a pair of plate electrodes $2a$, $2b$ as opposed to each other in the soil as illustrated in FIG. 2 and applying a high-voltage pulse between the two electrodes $2a$, $2b$. Yet another method similarly usable comprises burying a bar electrode $2b$ in the soil enclosed with a tubular electrode $2a$ formed of a net or perforated plate as illustrated in FIG. 3 and applying a high-voltage pulse between the two electrodes $2a$, $2b$. By this method, the treatment can be effected in a relatively wide area at one time. Desirably the farm product 3 is interposed between the two electrodes $2a$, $2b$ where the method of FIG. 2 is to be carried out after the plantation of the farm product 3 or the bar electrode $2b$ is disposed proximately to the farm product 3 where the method of FIG. 3 is to be performed after the plantation of the farm product 3, so as to ensure thorough treatment of the soil in the immediate neighborhood of the farm product 3.

Figure 4:
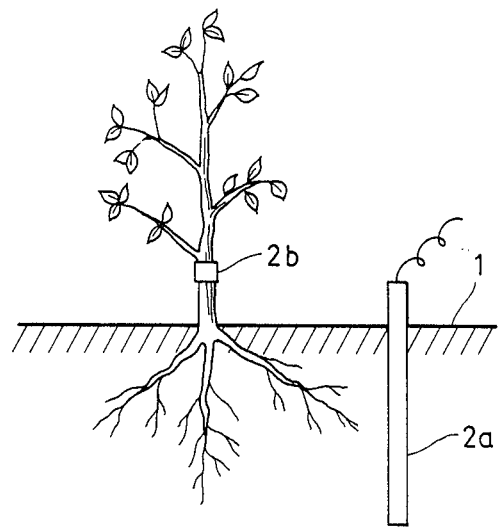
Figure 5:
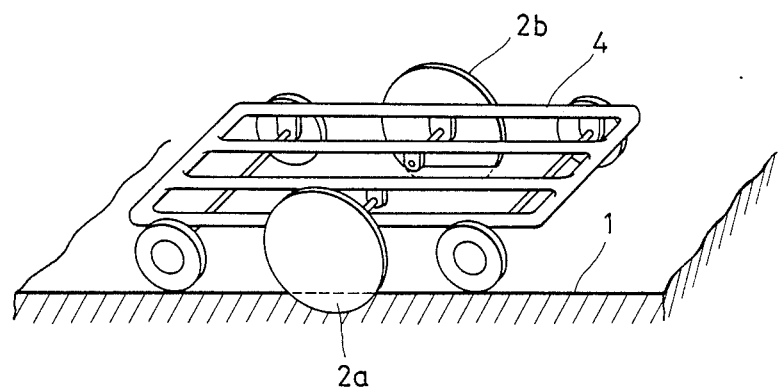

Particularly where the treatment of the soil 1 by this invention is to be carried out after the plantation of the farm product 3, it may be effected by burying one $2a$ of the electrodes in the soil 1 and disposing the other electrode $2b$ in contact with the farm product 3 as illustrated in FIG. 4 and applying a high-voltage pulse between the two electrodes $2a$, $2b$. By this method, the treatment of the neighborhood of the farm product 3 can be attained with enhanced certainty. Where the treatment is to be carried out in a wide area before the plantation of the farm product 3, it may be accomplished by preparing a truck 4 which is provided with disc electrodes $2a$, $2b$ adapted to rotate and sink into the soil in consequence of the movement of the truck as illustrated in FIG. 5, keeping a high-voltage pulse applied between the electrodes $2a$, $2b$ and drawing the truck 4 about the farm garden as with a tractor.

For the purpose of this invention, the pulsating electric current to be passed through the soil 1 is required to be not less than 50 mA, desirably not less than 100 mA, and optimally not less than 150 mA. If the intensity of the pulsating electric current is unduly low, the molds cannot be thoroughly extirpated and the desired effect of treatment cannot be attained.

When a pulsating electric current of the intensity mentioned above is passed through the soil 1, it acts as a violent shock current on the molds stealing growth in the soil. Since the electric current is of the nature causing a shock, the current, despite a relatively small intensity, is enough for the purpose of impeding or even terminating the activity of molds. Further, since the electric current is of a pulsating type and the duration of passage of this electric current is brief, the treatment produces virtually no adverse effect on the farm product 3 even when it is carried after the plantation of the farm product.

The upper limit of the intensity of the pulsating electric current is not specifically defined where the treatment is carried out before the plantation of the farm product 3. In due consideration of the effect on the human system, the effect possibly exerted when the treatment is performed after the plantation of the farm product 3, and the economization of the electric power to be consumed, however, it is desirable to fix this upper limit at about 1000 mA.

The electric current passed through the soil 1 in accordance with this invention is a pulsating direct current which is desired to be generated several times to some tens of times at the rate of once to some tens of times per one to two seconds. By continuous generation of an electric current, the effective extirpation of molds attained by the shock current cannot be expected. The continuous electric current not only fails to produce any appreciable effect of treatment but adversely affects the farm product 3 when the treatment is performed after the plantation of the farm product. Continuous supply of the electric current causes a heavy power consumption and entails the possibility that the electrolyzate consequently formed will quickly pollute the electrodes 2a, 2b even to the extent of rendering passage of electric current difficult.

The supply of the pulsating electric current contemplated by this invention may be carried out without altering the polarities, plus and minus, of the high-voltage pulse to be applied. Otherwise, it may be carried out by alternately switching the polarities, plus and minus, and reversing the direction of flow of the electric current per each pulse, for example.

Particularly where the soil 1 to be treated is dry, it often happens that generation of the pulsating electric current of the intensity mentioned above proves to be difficult. In this case, it is desirable for the soil 1 to be sprayed with an electrolytic solution incapable of inflicting any adverse effect on the farm product 3 prior to the supply of the pulsating electric current. Concrete examples of the electrolytic solution usable advantageously for this purpose include aqueous solutions of ammonium sulfate and ferrous sulfate. It is also permissible to use an aqueous solution of a plurality of electrolytes.

EXAMPLE 1

In an agar medium in petri dishes 10 cm in diameter, a strain of mold was inoculated and cultured for five days. After the culture, four such petri dishes were arranged in a row, copper wires were disposed so as to interconnect therewith the agar mediums held in the adjoining petri dishes, a pair of electrodes were inserted severally in the agar mediums held in the two outermost petri dishes, and the two electrodes were joined in series connection through the agar mediums held in the petri dishes and the copper wires interconnecting the petri dishes.

To each of the petri dishes, 30 cc of an aqueous solution of 0.01% by weight of ammonium sulfate was added. A pulsating direct current was passed between the two electrodes at a rate of 112 times per five seconds. This supply of the pulsating direct current was carried out in four 15-minute durations as intervals of 15 minutes, with each duration consisting of alternate 5-second ON and 5-second OFF cycles of the flow of the pulsating electric current. The intensity of electric current and the number of microorganisms were measured in each of the durations.

As the power source, an alternating current of a potential of 100 V rectified into a corresponding direct current and elevated to about 3000 V was used. This dc voltage was applied in a fixed direction, namely without altering the polarities, plus and minus, thereof. The intensity of the pulsating electric current was measured on the surface of the agar medium. The number of microorganisms was the average of the numbers found on all the petri dishes.

The results were as shown in Table 1.

EXAMPLE 2

A test was carried out by following the procedure of Example 1, excepting an aqueous solution of 0.01% by weight of ferrous sulfate was used in the place of the aqueous solution of ammonium sulfate.

The results were as shown in Table 1.

EXAMPLE 3

Tests were carried out by following the procedure of Example 1, excepting the concentration of the aqueous ammonium sulfate solution added to the petri dishes varied to 0.01, 0.05, and 0.1% by weight and the passage of the pulsating electric current was carried out in three 15-minute durations.

The results were as shown in Table 1.

EXAMPLE 4

Tests were carried out by following the procedure of Example 1, excepting the concentration of the aqueous ferrous sulfate solution added to the petri dishes varied to 0.01, 0.05, and 0.1% by weight and the passage of the pulsating electric current was carried out in three 15-minute durations.

The results were as shown in Table 1.

EXAMPLE 5

A test was carried out by following the procdure of Example 1, excepting the addition of the aqueous ammonium sulfate solution to the petri dishes was omitted. The results were as shown in Table 1. It is noted from the results that the treatment carried out by the supply of the fixed electric current was affected very little by the presence or absence of the electrolytic solution.

COMPARATIVE EXPERIMENT 1

A test was carried out by following the procedure of Example 5, excepting the magnitude of the pulsating electric current was lowered.

The results were as shown in Table 1.

COMPARATIVE EXPERIMENT 2

A test was carried out by following the procedure of Example 5, excepting the magnitude of the pulsating electric current was heightened. The results were as shown in Table 1.

In all the Examples and Comparative Experiments, the number of microorganisms before treatment was about $1 \times 10^8$.

TABLE 1

| Example | | 1 | 2 | 3 | 4 |
|---|---|---|---|---|---|
| 1 | Number of treatment | 1 | 2 | 3 | 4 |
| | Intensity of electric current (mA) | 340 | 350 | 350 | 350 |
| | Number of microorganisms after treatment | $1 \times 10^6$ | $3 \times 10^3$ | $3 \times 10^2$ | $1 \times 10^2$ |
| 2 | Number of treatment | 1 | 2 | 3 | 4 |
| | Intensity of electric current (mA) | 356 | 350 | 355 | 352 |
| | Number of microorganisms after treatment | $1 \times 10^6$ | $3.5 \times 10^3$ | $3.1 \times 10^2$ | $1.2 \times 10^2$ |
| 3 | Concentration of $(NH_4)_2SO_4$ (wt %) | 0.01 | 0.05 | 0.1 | |
| | Intensity of electric current (mA) | 350 | 380 | 400 | |
| | Number of microorganisms after treatment | $1 \times 10^3$ | $2 \times 10^2$ | $1 \times 10^2$ | |
| 4 | Concentration of $FeSO_4$ (wt %) | 0.01 | 0.05 | 0.1 | |
| | Intensity of electric current (mA) | 350 | 375 | 410 | |
| | Number of microorganisms after treatment | $2.8 \times 10^2$ | $2 \times 10^2$ | $1 \times 10^2$ | |
| 5 | Number of treatment | 1 | 2 | 3 | 4 |
| | Intensity of electric current (mA) | 352 | 350 | 350 | 350 |
| | Number of microorganisms after treatment | $1 \times 10^6$ | $2 \times 10^4$ | $1 \times 10^3$ | $1 \times 10^2$ |
| Comparative Experiment | | | | | |
| 1 | Number of treatment | 1 | 2 | 3 | 4 |
| | Intensity of electric current (mA) | 46 | 47 | 47 | 47 |
| | Number of microorganisms after treatment | $1 \times 10^7$ | $6 \times 10^6$ | $5 \times 10^6$ | $2 \times 10^6$ |
| 2 | Number of treatment | 1 | 2 | 3 | |
| | Intensity of electric current (mA) | 1300 | 1300 | 1300 | |
| | Number of microorganisms after treatment | $1 \times 10^6$ | $2 \times 10^3$ | $1 \times 10^2$ | |

What is claimed is:

1. A method for improvement of soil, comprising pulsating a direct current of not less than 50 mA and not more than 1 A through said soil.

2. The method according to claim 1, wherein said soil is sprayed with an electrolytic solution prior to said treatment.

3. The method according to claim 2, wherein ammonium sulfate is used as said electrolytic solution.

4. The method according to claim 2, wherein ferrous sulfate is used as said electrolytic solution.

* * * * *